(12) United States Patent
Levin et al.

(10) Patent No.: US 8,839,613 B2
(45) Date of Patent: Sep. 23, 2014

(54) HEAT SYSTEM FOR AN ENGINE

(75) Inventors: Michael Levin, Ann Arbor, MI (US);
Furqan Zafar Shaikh, Troy, MI (US);
Danrich Henry Demitroff, Okemos, MI (US); Donald Masch, White Lake, MI (US); Lawrence Marshall, Saint Clair Shores, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 229 days.

(21) Appl. No.: 13/367,014

(22) Filed: Feb. 6, 2012

(65) Prior Publication Data

US 2013/0199164 A1  Aug. 8, 2013

(51) Int. Cl.
| | |
|---|---|
| *F01N 3/02* | (2006.01) |
| *F01N 5/02* | (2006.01) |
| *F01N 3/10* | (2006.01) |
| *F28D 17/00* | (2006.01) |
| *F28D 19/00* | (2006.01) |
| *F02M 31/08* | (2006.01) |

(52) U.S. Cl.
USPC .................... 60/320; 60/299; 165/10; 165/52

(58) Field of Classification Search
USPC ......................... 60/299, 320; 165/10, 52, 202; 237/12.3 R, 12.3 A
See application file for complete search history.

(56) References Cited

U.S. PATENT DOCUMENTS

| | | | | |
|---|---|---|---|---|
| 4,667,876 | A * | 5/1987 | Negishi .................... | 237/12.3 A |
| 4,775,102 | A * | 10/1988 | Negishi et al. ........... | 237/12.3 A |
| 4,974,667 | A * | 12/1990 | Sun et al. ........................ | 165/41 |
| 5,082,174 | A * | 1/1992 | Joji ............................... | 237/2 A |
| 6,351,962 | B1 * | 3/2002 | Mizutani et al. ................ | 62/244 |
| 6,464,027 | B1 * | 10/2002 | Dage et al. ................. | 180/65.22 |
| 7,246,487 | B2 * | 7/2007 | Hara .............................. | 60/298 |
| 7,832,204 | B2 | 11/2010 | Bidner et al. | |
| 7,845,167 | B2 * | 12/2010 | Miyagawa et al. ............. | 60/320 |
| 7,946,112 | B2 * | 5/2011 | Miyagawa et al. ............. | 60/320 |
| 2005/0167079 | A1 * | 8/2005 | Zhang ............................ | 165/10 |
| 2008/0066886 | A1 * | 3/2008 | Mabuchi et al. ................ | 165/67 |
| 2008/0104971 | A1 * | 5/2008 | Sami ................................ | 62/78 |
| 2010/0001086 | A1 * | 1/2010 | Bhatti et al. ....................... | 237/6 |
| 2010/0043413 | A1 * | 2/2010 | Orihashi et al. ................ | 60/320 |
| 2010/0186399 | A1 * | 7/2010 | Huttinger ........................ | 60/320 |
| 2010/0242452 | A1 * | 9/2010 | Kawazu et al. ................. | 60/299 |
| 2011/0131962 | A1 * | 6/2011 | Toi et al. ......................... | 60/320 |

FOREIGN PATENT DOCUMENTS

| | | | | | |
|---|---|---|---|---|---|
| JP | 09119747 A | * | 5/1997 | ............. | F25B 27/02 |
| WO | 9520721 A1 | | 8/1995 | | |

* cited by examiner

*Primary Examiner* — Audrey K Bradley
(74) *Attorney, Agent, or Firm* — Julia Voutyras; Alleman Hall McCoy Russell & Tuttle LLP

(57) ABSTRACT

An exhaust system for an engine is disclosed herein. The exhaust system includes a catalytic converter, a heat collector downstream from the catalytic converter, and a heat transfer system receiving waste exhaust heat via a thermosyphon evaporator for storage and/or use in a cabin heating system. In this way, waste heat is utilized to provide better cabin heating, particularly at engine cold start.

12 Claims, 2 Drawing Sheets

HEAT SYSTEM FOR AN ENGINE

BACKGROUND AND SUMMARY

Vehicles may recover exhaust heat for transfer to various other systems in an internal combustion engine.

For example, U.S. Pat. No. 7,832,204 describes a heat pipe system for an engine that allows for heat transfer between two or more different engine systems. The heat pipe system includes a boiler end that may transfer heat from a high temperature region to a condenser end at a low temperature region. The boiler end may be coupled to a region of the exhaust system and the condenser end may be coupled to another engine system, such as an engine coolant system, for transferring heat.

The inventors herein have recognized various issues with the above system. In particular, rapid heat at engine start is not available because the system requires the exhaust system to warm up first. Further, transferring heat away from the exhaust system during a cold start operation delays the catalytic converter 'light-off.' As a result, the catalytic converter does not operate at an efficient temperature to burn trapped hydrocarbons, thereby increasing exhaust emissions.

As such, one example approach to address the above issues is to use a heat pipe and suitable phase change materials to recover exhaust heat upstream and/or downstream from a catalytic converter. Further, heat may be stored for rapid use at engine start in terms of cabin heating and/or engine heating (through warming of engine coolant with the stored heat). In this way, it is possible to recover heat from the exhaust system via the stored heat, without adversely affecting a rate of reaching the catalytic converter light-off temperature, while at the same time providing more rapid cabin heating at cold engine starts and possibly more rapid engine heating (to reduce engine friction and thus improve fuel economy).

According to one embodiment, one or more heat pipes transfer excess exhaust heat to a closed thermosyphon loop, the loop including a phase change material housed within, and contained within, a heater core. During warmed up engine operation before engine shutdown, the one or more heat pipes transfer the excess exhaust heat to the thermosyphon loop, which in turn transfers the heat to the heater core to be stored in the phase change material within the heater core. Then, when the vehicle is shut-off, the phase change material in the heater core stores the heat for use during a subsequent engine cold start. During the cold start, airflow can be passed over the heater core to transfer heat from the phase change material to passenger cabin air, thus providing warm air to the vehicle's passenger cabin. Optionally, engine coolant can also be circulated in an engine coolant loop of the engine coolant system to the heater core to extract heat from the phase change material via heat transfer, which then enables warmed coolant to be returned to the engine to heat the cold engine and reduce engine friction.

Note that the heat transfer between the thermosyphon loop and the phase change material of the heater core may be through non-contact operation within the heater core, such as through a heat exchanger. Likewise, the heat transfer between the engine coolant loop (which is separate from the thermosyphon loop) and the phase change material of the heater core may be through non-contact operation within the heater core, such as through another heat exchanger in the heater core, if desired. Thus, in one example, the heater core may include three or more heat exchangers: one for heat transfer between the thermosyphon loop and the phase change material, one for heat transfer between the phase change material and passenger cabin air, and one for heat transfer between the phase change material and engine coolant.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
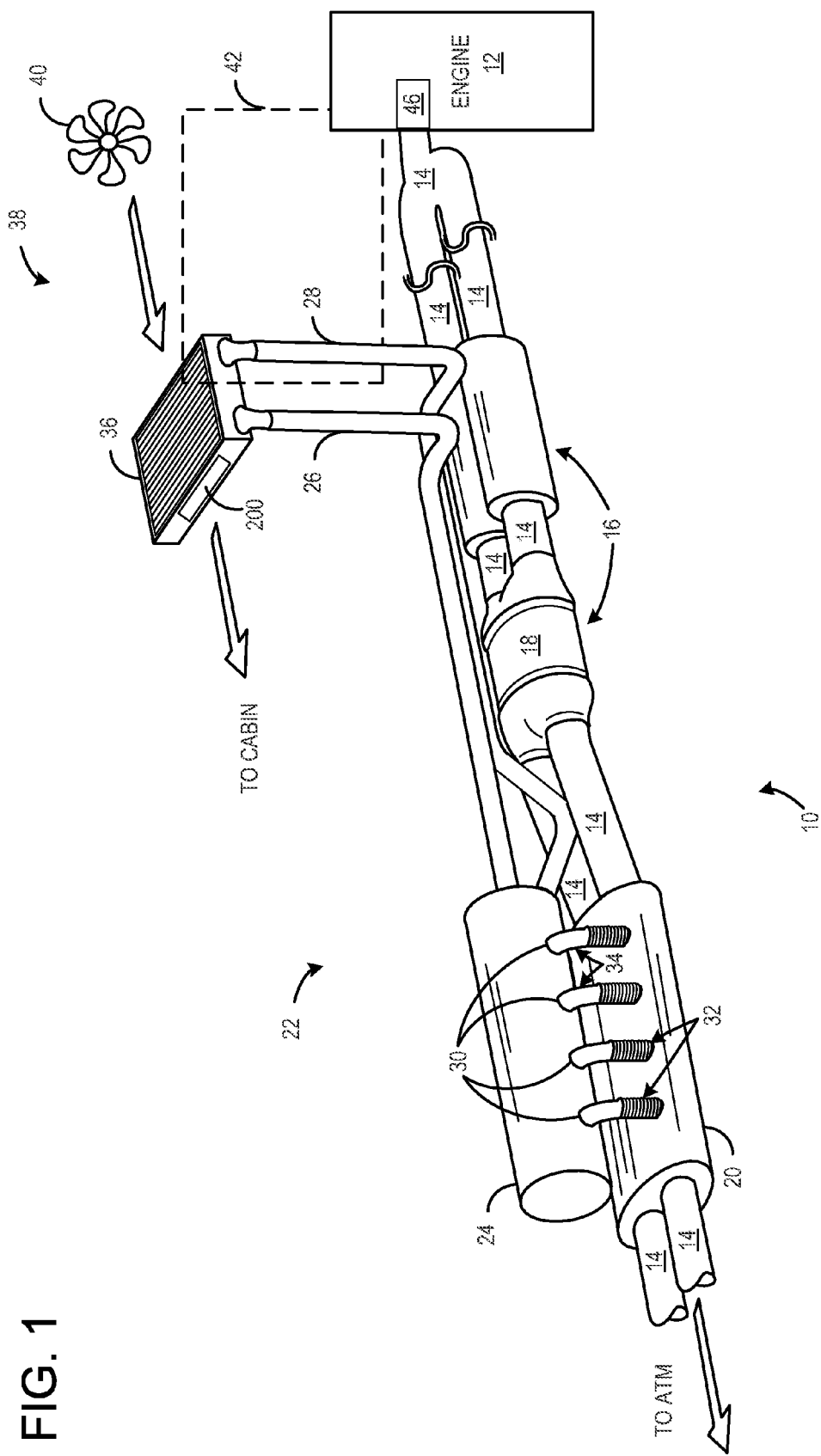
FIG. 1 schematically shows an example exhaust system for an engine according to an embodiment of the present disclosure.

The following description relates to a heat transfer system including phase change materials, which are arranged in such a way that thermal energy from an exhaust system can be recovered. The example arrangements described herein allow thermal energy to be recovered and stored for later heating of a passenger cabin, for example. For example, according to an embodiment of the present disclosure, a heat transfer system may be configured to recover heat from an exhaust system and provide said heat to a passenger cabin via a heater core, without coupling the heater core to an engine coolant system. Various heat pipes may be included in the disclosed system. For example, one or more heat pipes may couple an exhaust system to a system including the phase change material. Further, the system may use a thermosyphon evaporator to advantageously control the transfer and storage of heat.

For example, the heat transfer system may utilize a thermosyphon evaporator in conjunction with phase change materials in the heater core to store heat even when the engine is not in operation. For example, the thermosyphon evaporator may be in communication with an exhaust system component downstream from the catalytic converter via one or more heat pipes. The thermosyphon evaporator may be positioned vertically above the downstream component. In this way, heat may transfer to the thermosyphon evaporator even after the engine is no longer in operation. For example, the thermosyphon evaporator may be insulated to store heat recovered from the exhaust system for passive, gravity-driven circulation through a pipe to the heater core, such that the stored heat may be available for immediate use at engine start.

It will be appreciated that 'vertically above' as described herein refers to a component/feature vertically above another component/feature with respect to the ground over which the vehicle travels.

Additionally, the heat transfer system may include various heat transfer fluids to extract thermal energy from the exhaust system under a variety of different operating conditions. In this way, thermal energy may be recovered from the exhaust system to provide heat to various other systems such as a cabin heating system, lubrication systems, and/or other exhaust system components, if desired. As the heat transfer fluids may cycle through the heat transfer system absorbing, transporting, and releasing thermal energy, it is common to refer to such fluids as 'working fluids'.

Further, the example systems allow for a simpler design as compared to traditional designs. For example, heat stored in phase change materials in a heater core may be supplied to a cabin heating system at engine start, as introduced above. By coupling the thermosyphon evaporator to a component of the exhaust system downstream from the catalytic converter, and coupling the thermosyphon evaporator to the heater core which contains phase change materials, the cabin heating system may provide heat to the passenger cabin at engine start separate from, and without relying upon, an engine coolant system, and therefore, without waiting for the engine coolant system to warm up at cold engine starts (e.g., when the engine has cooled to ambient). Further, the one or more heat pipes coupling the exhaust system to the thermosyphon evaporator may provide heat to the cabin heating system without delaying catalytic converter light-off, as described above.

FIG. 1 is a schematic diagram of an example exhaust system 10 for an engine 12. Exhaust system 10 may include one or more exhaust passages 14 that communicate with engine 12 to exhaust gases to the atmosphere. Further, exhaust system 10 may include one or more exhaust emission control devices 16, such as a catalytic converter 18, to reduce particulates within the exhaust gases prior to release to the atmosphere.

Exhaust system 10 may further include a heat collector 20 downstream from catalytic converter 18. In one example, catalytic converter 18 is the final emission control device within exhaust system 10. In other words, catalytic converter is the last emission control device such that no other emission control device is positioned downstream from catalytic converter 18. As shown, heat collector 20 may have a cross-sectional area that is greater than a cross-sectional area of each of the exhaust passages 14 just upstream from heat collector 20. As such, heat collector 20 may affect a flow characteristic of the exhaust gases entering the heat collector 20 from the one or more exhaust passages 14. For example, the velocity of the exhaust gases may decrease upon entering heat collector 20. As such, heat collector 20 may retain heat from exhaust system 10. In some embodiments, heat collector 20 is a dual purpose component of the exhaust system having both heat-collecting capabilities and muffling capabilities.

It will be appreciated that exhaust system 10 is depicted in simplified form by way of example and may include additional and/or alternative components than those shown in FIG. 1.

For example, exhaust system 10 may include various emission control devices additionally and/or alternatively to catalytic converter 18. As such, exhaust system 10 may include a three-way catalyst (TWC), NO trap, various other emission control devices, or combinations thereof. In some embodiments, during operation of the engine, the one or more emission control devices may be periodically reset by operating at least one cylinder of the engine within a particular air-fuel ratio.

Further, it will be appreciated that exhaust system 10 may include various sensors for providing an indication of exhaust gas air-fuel ratio such as a linear oxygen sensor or UEGO (universal or wide-range exhaust gas oxygen), a two-state oxygen sensor or EGO, a HEGO (heated EGO), a NO sensor, an HC sensor, and/or a CO sensor.

During operation of engine 12, components of exhaust system 10 may increase in temperature. For example, heat collector 20 may reach a temperature approximately equal to that of the exhaust gas passing through heat collector 20. To harness this thermal energy potential, heat transfer system 22 may be coupled to exhaust system 10.

Heat transfer system 22 may include a thermosyphon evaporator 24, and one or more pipes. As shown in FIG. 1, heat transfer system 22 may include a first pipe 26 and a second pipe 28, although another suitable number of pipes is possible with departing from the scope of this disclosure.

Heat transfer system 22 may include one or more phase change materials to transfer thermal energy away from the exhaust system and provide the recovered thermal energy to another engine system. In this example, heat transfer system 22 may be arranged in such a way so as to transfer thermal energy away from exhaust system 10 downstream from catalytic converter 18. Heat transfer system 22 may capture heat from exhaust feed gas instead of allowing all the thermal energy to escape to the environment via the one or more exhaust passages 14. For example, heat transfer system 22 may include components in contact with exhaust system 10 to recover heat via conduction. In other words, heat transfer system 22 may include components in physical contact, and in thermal contact, with components of exhaust system 10.

Thermosyphon evaporator 24 may be positioned vertically above heat collector 20, for example, vertically above with respect to the ground over which the vehicle travels, as described above. In some embodiments, thermosyphon evaporator 24 may be a heat exchange component. Further, in some embodiments, thermosyphon evaporator 24 may include various materials and structures thereof to increase the heat storage and heat transfer capability of thermosyphon evaporator 24.

As shown, thermosyphon evaporator 24 may be in fluidic communication with heat collector 20 via a plurality of heat pipes 30. As such, the plurality of heat pipes 30 may physically and thermally connect the thermosyphon evaporator 24 to the heat collector 20. Since a fluid with a higher temperature naturally rises above a fluid with a lower temperature, the plurality of heat pipes 30 may help facilitate the transfer of thermal energy vertically from heat collector 20 to thermosyphon evaporator 24. Further, heat pipes 30 may extend substantially vertically from heat collector 20 as shown. For example, a least a portion of each of the heat pipes 30 may be approximately orthogonal to a top surface of heat collector 20. In other words, heat pipes 30 may be oriented substantially orthogonal to the ground over which the vehicle travels. Further, as shown, a portion of each of the heat pipes 30 may bend from the orthogonal portion in a direction towards thermosyphon evaporator 24. It will be appreciated that such a bending portion may redirect exhaust heat at various angles. Further, in some embodiments, the plurality of heat pipes 30 may not include bending portions.

FIG. 1 shows four heat pipes 30; however, it will be appreciated that heat transfer system 22 may include an additional four heat pipes 30 on another side of heat collector 20 and thermosyphon evaporator 24. It is to be understood that various numbers of heat pipes 30 may be used without departing from the scope of this disclosure.

The plurality of heat pipes 30 may each include a flexible region 32. For example, a flexible region 32 may be included within the substantially vertical portion of each of the heat pipes 30. Such a flexible region may reduce vibration between components. For example, it may be desirable to couple thermosyphon evaporator 24 to a frame of a vehicle (not shown). As described above, heat collector 20 may be coupled to the one or more exhaust passages 14, and thus, flexible regions 32 may enable movement of the exhaust system components relative to the frame-mounted thermosyphon evaporator 24.

Flexible regions 32 may be corrugated sections of the plurality of heat pipes 30, for example. As such, the corrugated sections may provide an additional advantage of facilitating rotational movement of fluid between heat collector 20 and thermosyphon evaporator 24. In other words, flexible regions 32 may induce swirling of fluid which may contribute to heating the internal surfaces of thermosyphon evaporator 24.

It will be appreciated that flexible regions 32 may be comprised of any suitable material to compensate for movement between thermosyphon evaporator 24 and heat collector 20. Further, it will be appreciated that flexible regions 32 may be comprised of the same material as non-flexible regions 34 of the plurality of heat pipes 30. In some embodiments, flexible regions 32 may be comprised of different materials than non-flexible regions 34.

In this way, after vehicle warm-up, excess heat is transferred via heat pipes 30 to the thermosyphon evaporator 24, which then stores heat for passive, gravity-driven circulation through pipe 26 to heater core 36, which may be coupled in a cabin heating system as noted herein. Specifically, the heat transferred to thermosyphon evaporator 24 causes evaporation due to heating of the working fluid in the thermosyphon evaporator 24 from liquid to vapor form. The vaporized working fluid is transported via pipe 26 to heater core 36, which may include one or more PCM stacks 200. Each PCM stack 200 may include a plurality of phase change material elements configured to store heat. As heat from the vaporized working fluid is stored in one or more PCM stacks 200 at the heater core 36, the working fluid is thereby cooled and condensed to a liquid at heater core 36, and is then returned to the thermosyphon evaporator 24 via pipe 28. Such stored heat in heater core 36 can be available for at least 10 hours and up to 16-24 hours after engine shut-off, and thus can be immediately available for use with the cabin heating system upon cold engine starts, where it can warm incoming air directed to the passenger cabin. Further, an engine coolant system (not shown) may include an engine coolant loop 42 along with other components (e.g., a pump, a radiator, etc.). Engine coolant (via engine coolant loop 42) may also pass through heater core 36 (of cabin heating system 38) to be warmed during an engine start via the previous exhaust heat stored in the PCM stack(s) 200. Such warmed engine coolant may also be used to additionally warm the cabin via an engine coolant heater core of the engine coolant system, separate from heater core 36, thus providing multiple sources of warm passenger cabin air during a cold engine start, as well as faster engine warm-up. The first and second pipes, in combination with the heat pipes, thermosyphon evaporator, and heater core, form a closed thermosyphon loop.

In an alternative embodiment, heater core 36 may not include a phase change material, and thus the heater core may not be coupled with the engine coolant loop 42.

As noted above, heater core 36 may be a component of a cabin heating system 38. For example, cabin heating system 38 may provide heat to a passenger cabin (not shown) such that a vehicle operator and any passengers may occupy the passenger cabin at a comfortable temperature. To vent heat to the passenger cabin, a fan 40 may be directed at heater core 36 in any suitable orientation to transfer heat to the passenger cabin via convection.

It will be appreciated that cabin heating system 38 is depicted in simplified form and may include additional and/or alternative components than those shown in FIG. 1, such as an additional engine-coolant-based heater core with a separate fan, or also utilizing fan 40. Further, it will be appreciated that cabin heating system 38 may not be coupled to the engine coolant system in one embodiment; however, cabin heating system 38 may be coupled to the engine coolant system in addition to heat transfer system 22, as noted above. The particular spatial arrangement of cabin heating system 38 relative to heat transfer system 22 and exhaust system 10 is provided by way of example to illustrate a general concept. As such, cabin heating system 38 may have a different spatial arrangement than the illustrated example without departing from the scope of this disclosure. In other words, the components of cabin heating system 38, heat transfer system 22, and/or exhaust system 10 are not necessarily drawn to scale.

Further, it will be appreciated that cabin heating system 38 is separate from heat transfer system 22 and exhaust system 10. As such, cabin heating system 38 does not include the heat collector, the thermosyphon evaporator, or the catalytic converter. Cabin heating system 38 includes the heater core, the fan, and other cabin heating components that are pertinent to heating the passenger cabin (e.g., a passenger cabin vent, a heating conduit coupling the heater core to the vent, etc.), and further, such components are separate from the heat transfer system 22 and the exhaust system 10.

Returning to heat transfer system 22, with such an arrangement as introduced above, the heater core 36 may store heat for use at engine start up. The inventors herein have recognized that the PCM stack(s) 200 of heater core 36 may retain sufficient heat for at least 10 hours and up to 16-24 hours, in one example, after the engine ignition is turned off, for some environmental conditions. Therefore, it can provide heat at engine start for immediate passenger comfort.

Further, since the cabin heating system 38 provides heat to a passenger cabin separate from, and optionally without being coupled to, an engine coolant system, the heating system may be simplified in design. Therefore, the engine coolant system may also be simplified in design. For example, the engine coolant system may be smaller and contain less coolant than an engine coolant system configured to support the cabin heating system. Reducing the volume of coolant in the coolant system may also enable a faster engine warm-up, and thus reduce cold start fuel consumption and emissions.

Further, by harnessing thermal energy from exhaust system 10 downstream from catalytic converter 18, a rate of achieving light-off is not adversely affected by heat transfer system 22. Therefore, the performance of catalytic converter 18 is not hindered by heat transfer system 22, and cold start emissions standards can be met.

It will be appreciated that heat transfer system 22 is provided by way of example, and thus, is not meant to be limited to the embodiment as illustrated and described with respect to FIG. 1. Therefore, it is to be understood that the heat transfer system may include additional and/or alternative features than those shown in FIG. 1.

Figure 2:
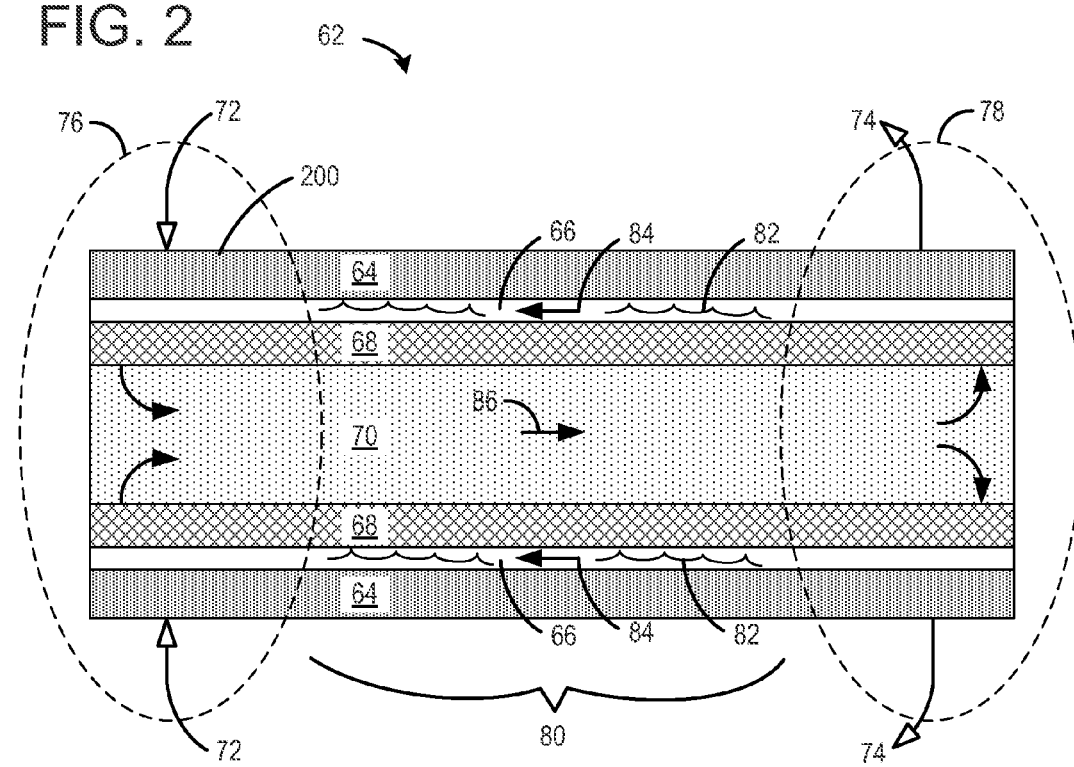
FIG. 2 schematically shows an example heat pipe that may be included in the example system of FIG. 1.

FIG. 2 schematically shows a sectional cut of a heat pipe 62 according to an embodiment of the present disclosure. For example, the sectional cut may be along a longitudinal axis of the heat pipe. Heat pipe 62 may be one or more of heat pipes 30, for example.

Heat pipe 62 may be any reasonable shape and is not limited to a hollow cylinder in the traditional sense of the term 'pipe.' Rather, heat pipe 62 may be generally thought of as a conduit for thermal energy transfer. As such, heat pipe 62 may assume any suitable geometry. For example, heat pipe 62 may be a branched or lobed structure to closely follow the contours of an exhaust manifold, such as integrated exhaust manifold 46. It will be appreciated that other geometric shapes are possible without departing from the scope of this disclosure. Further, heat pipe 62 may be a single heat pipe or a bundle of heat pipes, wherein the bundle may include multiple heat pipes packaged within a common enclosure, for example.

Heat pipe 62 may include outer shell 64, liquid film layer 66, wicking layer 68, and vapor space 70. As shown, outer shell 64 may be an external layer with liquid film layer 66 and wicking layer 68 following as successively more interior layers than outer shell 64. Finally, vapor space 70 may be an innermost layer. For example, vapor space 70 may be a central void within heat pipe 62.

Outer shell 64 may be a thermally conductive solid. For example, outer shell 64 may be a copper shell; however, other conductive solids are possible without departing from the scope of this disclosure. As a conductive solid, outer shell 64 may permit thermal energy to be passively absorbed (as indicated at arrows 72) and passively released (as indicated at arrows 74). As shown, thermal energy may be passively absorbed within an evaporative region 76. Evaporative region 76 may correspond to a heat source, such as a component of an exhaust system, as described above. For example, evaporative region 76 may be coupled to heat collector 20, and/or exhaust manifold 46 to absorb thermal energy via conduction. As such, evaporative region 76 may physically contact at least one surface of heat collector 20 and/or exhaust manifold 46. In this way, evaporative region 76 may be contiguous with heat collector 20 and/or exhaust manifold 46.

As shown, thermal energy may be passively released within a condenser region 78. As one example, condenser region 78 may be coupled to thermosyphon evaporator 24 to release thermal energy via conduction. In other words, condenser region 78 may be contiguous with thermosyphon evaporator 24. However it will be appreciated that condenser region 78 may be coupled to any engine system, to provide thermal energy to a component of that system via conduction. As another example, condenser region 78 may release thermal energy to the atmosphere via convection. Adiabatic region 80 may be a region between evaporative region 76 and condenser region 78. Adiabatic region 80 may describe a region of heat pipe 62 where the net heat transfer is zero. In other words, adiabatic region 80 may not absorb or release thermal energy to/from a surrounding environment.

Liquid film layer 66 may include heat transfer fluid (HTF) 82. HTF 82 may also be referred to as a working fluid to those well-versed in the art. HTF 82 may be any suitable fluid for absorbing/releasing thermal energy. Further, the particular type of HTF used for a heat transfer system may be selected and tuned such that the fluid properties of the HTF appropriately match the desired thermal specifications of the systems in communication with the heat transfer system.

HTF 82 may flow within liquid film layer 66 in a direction generally indicated by arrow 84. As shown, HTF 82 may flow from condenser region 78 to evaporative region 76. In other words, HTF 82 may flow from a cold side to a warmer side of heat pipe 62.

Wicking layer 68 may include any suitable material to assist with the migration of HTF during phase changes. For example, wicking layer 68 may assist in migrating evaporated HTF from liquid film layer 66 to vapor space 70 within evaporative region 76. Further, wicking layer 68 may assist in migrating condensed HTF vapor from vapor space 70 to liquid film layer 66 within condenser region 78. Therefore, wicking layer 68 may be comprised of a non-absorptive material. As one example, wicking layer 68 may include a wax-coated fiber; however, other materials are possible without departing from the scope of this disclosure. In some embodiments, HTF liquid and/or vapor may be carried between the various layers of heat pipe 62 within a separate enclosure.

Vapor space 70 may include HTF in vapor form. HTF vapor may flow within vapor space 70 in a direction generally indicated by arrow 86. As shown, HTF vapor may flow from evaporative region 76 to condenser region 78. In other words, HTF vapor may flow from a hot side to a cooler side of heat pipe 62.

In this way, thermal energy may be absorbed and released by heat pipe 62. By taking advantage of materials such as HTF 82, thermal energy may be carried away from one environment and provided to another environment. Since the amount of thermal energy absorbed and released corresponds to the amount of latent energy required for a phase change of the HTF to occur, the working fluid cycles between liquid and vapor form within heat pipe 62.

The systems described herein utilize one or more heat pipes in different ways to recover thermal energy that would otherwise be wasted and/or detrimental to downstream system components. For example, thermal energy may be recovered from an exhaust system to provide heat to a passenger cabin, as described above.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine exhaust system, comprising:
   a heat collector vertically below a thermosyphon evaporator and downstream of a catalytic converter;
   a plurality of heat pipes, coupled between the heat collector and the evaporator, each comprising an outer shell, a liquid film layer, a wicking layer, and a vapor space;
   a first pipe coupling the evaporator to a heater core containing a phase change material which stores heat for at least 10 hours; and
   a second pipe coupling the heater core to the evaporator, the heater core further coupled to an engine coolant system.

2. The exhaust system of claim 1, wherein the plurality of heat pipes each include a flexible region oriented perpendicular to a top surface of the heat collector.

3. The exhaust system of claim 1, wherein the heat collector is coupled to an exhaust passage, the heat collector having a larger cross-sectional area than the exhaust passage.

4. The exhaust system of claim 1, wherein the catalytic converter is a final emission control device.

5. The exhaust system of claim 1, wherein the engine coolant system is a cabin heating system.

6. The exhaust system of claim 1, wherein the engine coolant system is a cabin heating system, and wherein the heater core and a fan are included in the cabin heating system.

7. The exhaust system of claim 1, wherein each heat pipe includes a flexible coupling to the evaporator.

8. An engine heating system, comprising:
   a heater core containing a phase change material which stores heat for at least 10 hours fluidically communicating with a passenger cabin and a fan and thermally coupled with an engine coolant loop;

a heat transfer system passively thermally coupling an exhaust component to the heater core including one or more heat pipes coupling a closed thermosyphon loop with an exhaust heat collector arranged vertically below the closed thermosyphon loop.

9. The heating system of claim 8, wherein the closed thermosyphon loop includes a heat storage container coupled vertically above the exhaust heat collector via the one or more heat pipes, the heat collector downstream of a final catalytic emission control device of an exhaust system.

10. An engine heat transfer system, comprising:
a heat collector coupled to an exhaust passage downstream from a catalytic converter;
a thermosyphon evaporator positioned vertically above the heat collector;
a plurality of heat pipes coupled between the thermosyphon evaporator and the heat collector, a flexible region of each heat pipe oriented perpendicular to, and coupled at, a top surface of the heat collector; and
a first pipe coupling the thermosyphon evaporator to a heater core containing a phase change material which stores heat for at least 10 hours, the heater core further coupled to an engine coolant system.

11. The heat transfer system of claim 10, wherein each heat pipe includes a flexible coupling.

12. The heat transfer system of claim 10, wherein the thermosyphon evaporator is mounted to a vehicle frame and the flexible region of each heat pipe allows movement between exhaust system components and the thermosyphon evaporator.

* * * * *